US012551949B2

(12) United States Patent
Tanaka et al.

(10) Patent No.: US 12,551,949 B2
(45) Date of Patent: Feb. 17, 2026

(54) METHOD FOR PRESSING TAILSTOCK OF MACHINING APPARATUS, MACHINING APPARATUS, AND COMPUTER-READABLE STORAGE MEDIUM

(71) Applicant: Yamazaki Mazak Corporation, Niwa-gun (JP)

(72) Inventors: Naoya Tanaka, Niwa-gun (JP); Toraharu Ryuta, Niwa-gun (JP); Hiroyuki Ueki, Niwa-gun (JP); Masaki Hirose, Niwa-gun (JP); Yuji Sakai, Niwa-gun (JP); Nozomu Sawamura, Niwa-gun (JP); Shogo Kakehi, Niwa-gun (JP); Kazuya Kusaka, Niwa-gun (JP)

(73) Assignee: YAMAZAKI MAZAK CORPORATION, Niwa-gun (JP)

( * ) Notice: Subject to any disclaimer, the term of this patent is extended or adjusted under 35 U.S.C. 154(b) by 523 days.

(21) Appl. No.: 18/327,057

(22) Filed: Jun. 1, 2023

(65) Prior Publication Data

US 2023/0302543 A1      Sep. 28, 2023

Related U.S. Application Data

(63) Continuation of application No. PCT/JP2020/045309, filed on Dec. 4, 2020.

(51) Int. Cl.
*B23B 23/04*     (2006.01)
(52) U.S. Cl.
CPC ................... *B23B 23/04* (2013.01)
(58) Field of Classification Search
None
See application file for complete search history.

(56) References Cited

U.S. PATENT DOCUMENTS 5,282,402 A * 2/1994 Cady ............... B23B 23/00
                                              82/134
5,555,178 A * 9/1996 Hashimoto ......... G05B 19/182
                                              82/1.11
2009/0199685 A1   8/2009 Ichikawa et al.

FOREIGN PATENT DOCUMENTS

JP        06-055310       3/1994
JP        2001-105210     4/2001
            (Continued)

OTHER PUBLICATIONS

International Search Report for corresponding International Application No. PCT/JP2020/045309, Jan. 19, 2021.
(Continued)

*Primary Examiner* — Ryan A Jarrett
(74) *Attorney, Agent, or Firm* — MORI & WARD, LLP

(57) ABSTRACT

A machining apparatus includes a processor configured to control an actuator to move a tailstock in a first direction at a first speed, to detect a contact between the tailstock and a workpiece based on a change in an input amount to the actuator while the actuator is controlled to move the tailstock at the first speed, to control the actuator to stop moving the tailstock when the contact is detected, to control the actuator to move the tailstock by a first distance in a second direction, to control the actuator to move the tailstock in the first direction at a second speed lower than the first speed, and to control the actuator to stop moving the tailstock, when the input amount to the actuator becomes a value corresponding to the target pressing force while the actuator is controlled to move the tailstock at the second speed.

20 Claims, 7 Drawing Sheets

(56) References Cited

FOREIGN PATENT DOCUMENTS

| JP | 2003-175441 | 6/2003 |
|----|-------------|--------|
| JP | 2007-007743 | 1/2007 |
| JP | 2008-302436 | 12/2008 |
| JP | 2009-184087 | 8/2009 |
| JP | 2010-120133 | 6/2010 |
| KR | 20030000507 | 1/2003 |

OTHER PUBLICATIONS

Written Opinion for corresponding International Application No. PCT/JP2020/045309, Jan. 19, 2021.
Japanese Office Action for corresponding JP Application No. 2021-505434, Apr. 28, 2021, (w/ English machine translation).
Japanese Office Action for corresponding JP Application No. 2021-505434, Jul. 28, 2021, (w/ English machine translation).
European Office Action for corresponding EP Application No. 20964325.3-1103, Sep. 10, 2024.
International Preliminary Report on Patentability (Chapter I) with translation of Written Opinion for corresponding International Application No. PCT/JP2020/045309, Jun. 15, 2023.
European Office Action for corresponding EP Application No. 20964325.3-1103, Nov. 24, 2023.
Supplementary European Search Report for corresponding EP Application No. 20964325.3-1103, Feb. 7, 2024.
European Office Action for corresponding EP Application No. 20964325.3-1103, Feb. 19, 2024.

\* cited by examiner

FIG. 5
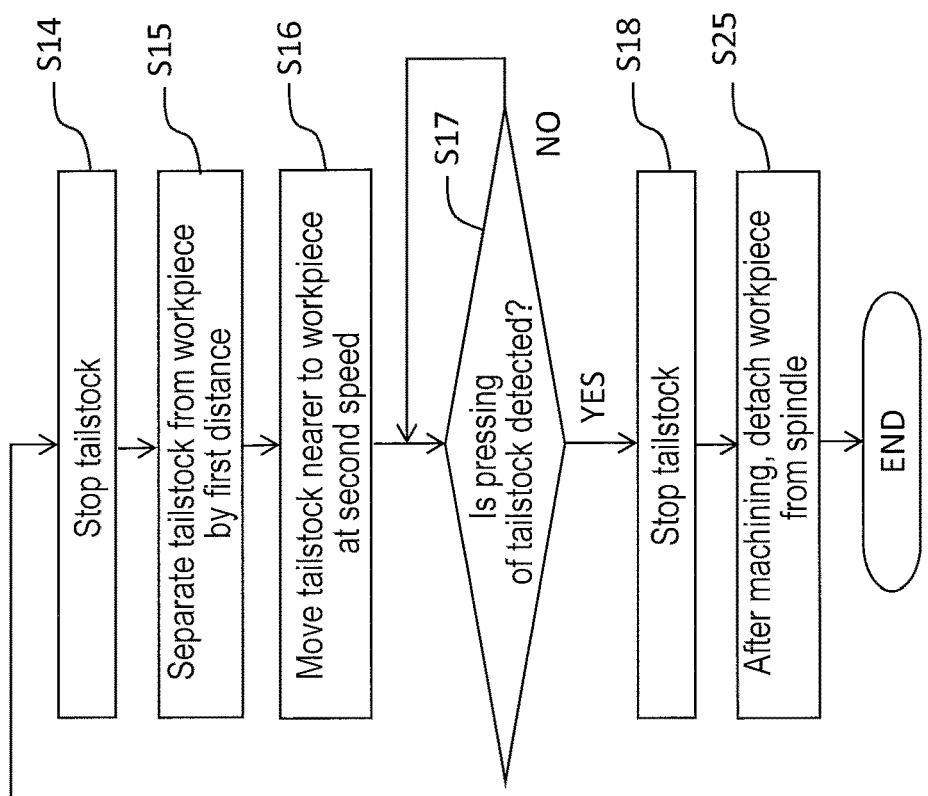
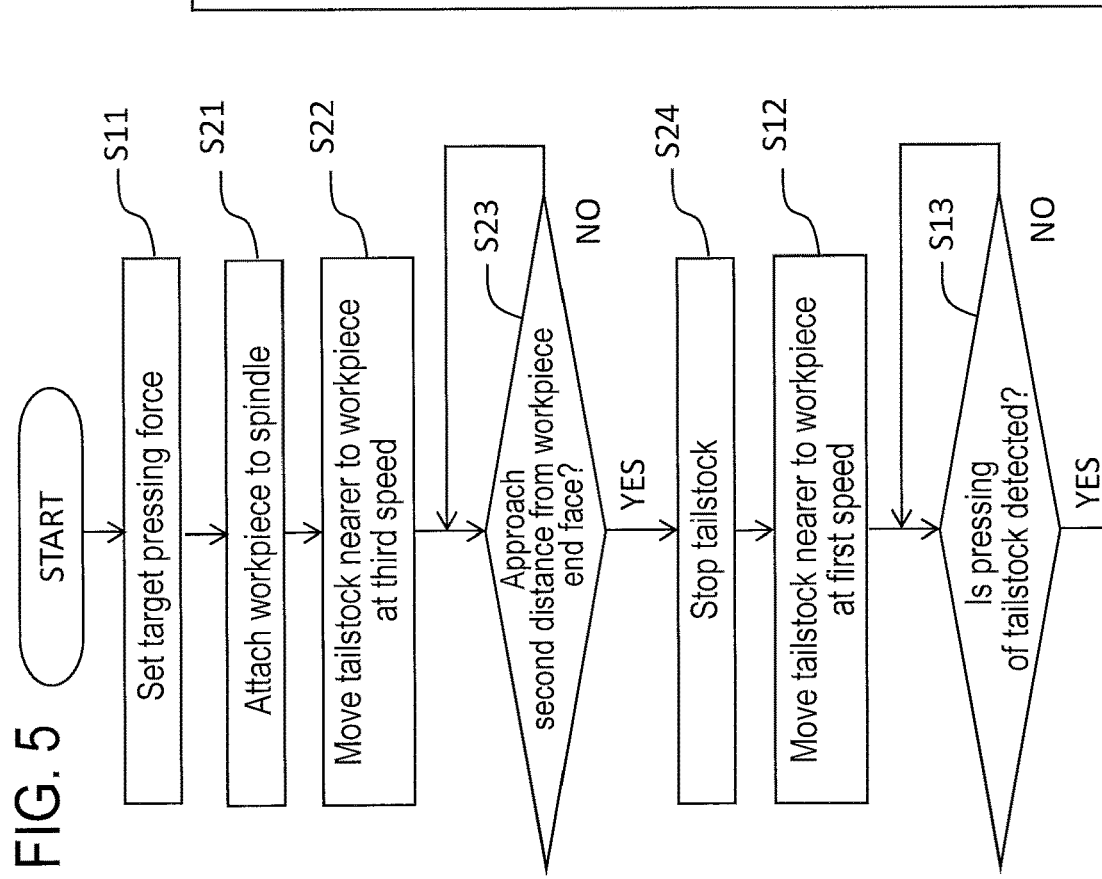

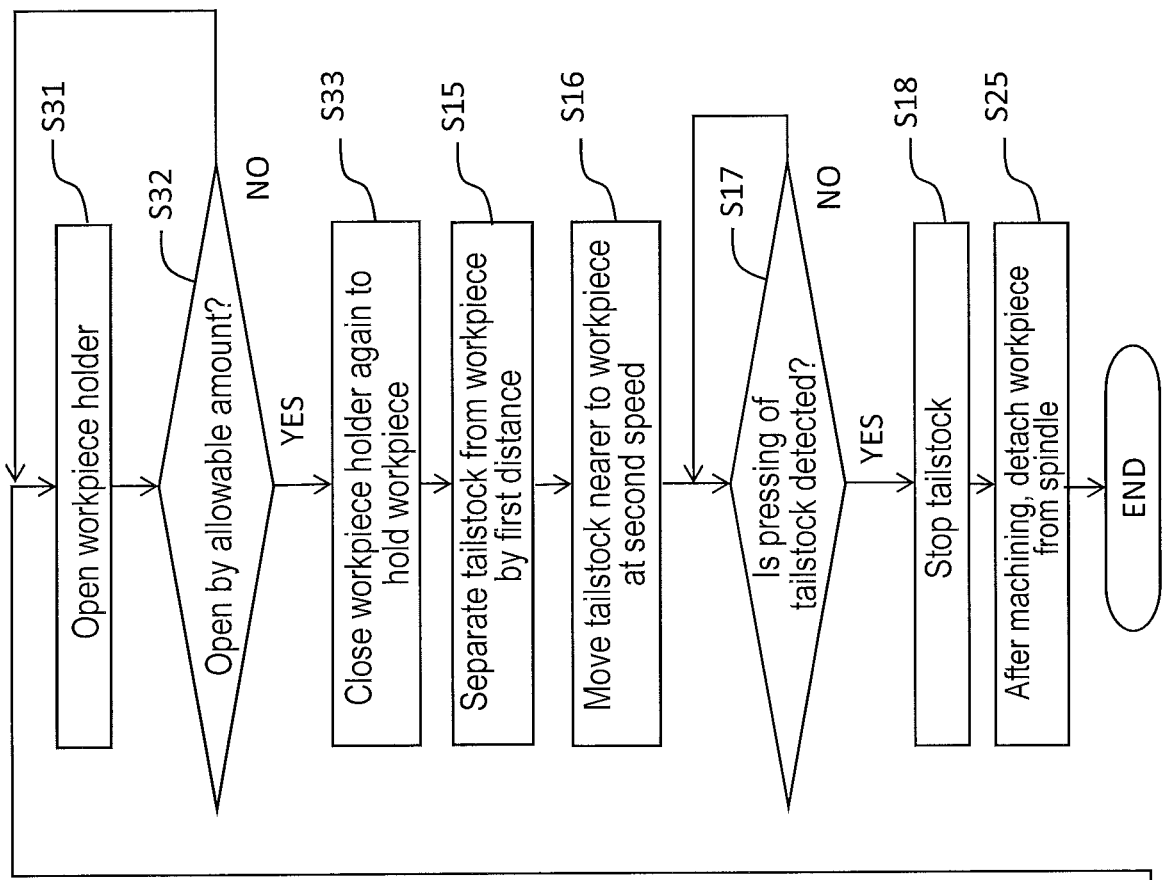
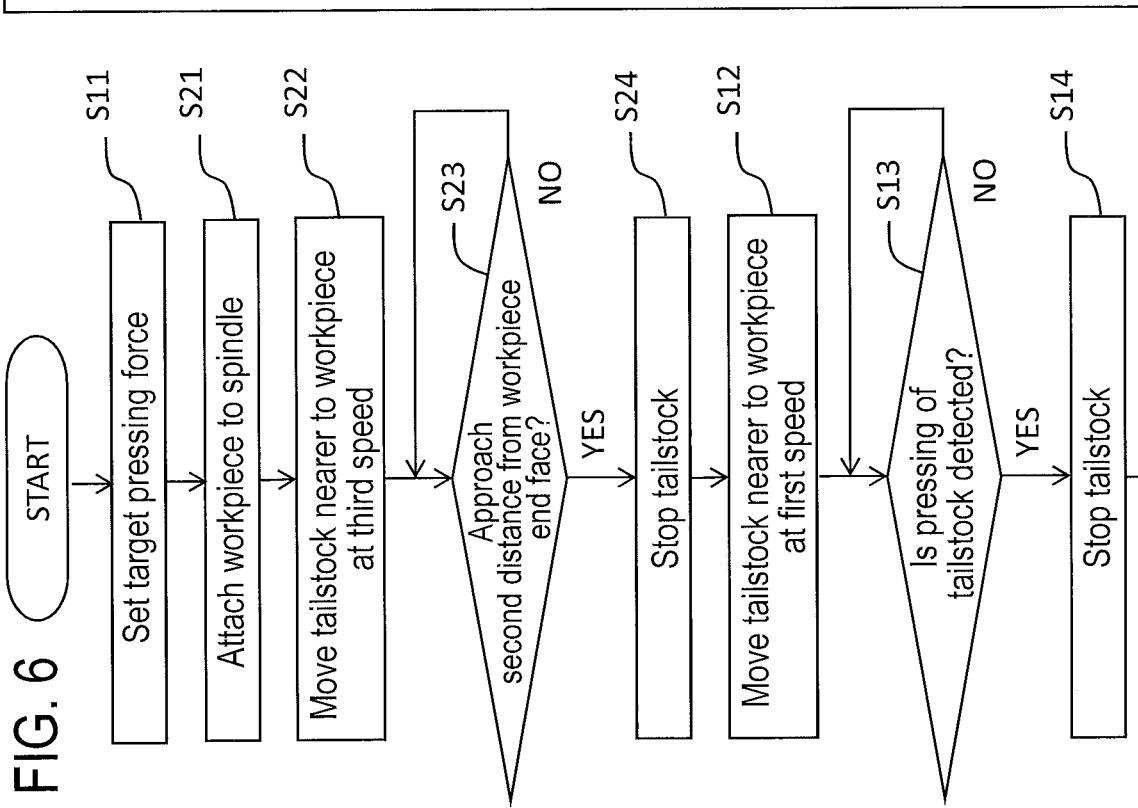
FIG. 6

US 12,551,949 B2

METHOD FOR PRESSING TAILSTOCK OF MACHINING APPARATUS, MACHINING APPARATUS, AND COMPUTER-READABLE STORAGE MEDIUM

CROSS-REFERENCE TO RELATED APPLICATIONS

The present application is a continuation application of International Application No. PCT/JP2020/045309, filed Dec. 4, 2020. The contents of this application are incorporated herein by reference in their entirety.

BACKGROUND OF THE INVENTION

Field of the Invention

The present invention relates to a method for pressing a tailstock of a machining apparatus, a machining apparatus, and a computer-readable storage medium.

Discussion of the Background

JP 2008-302436 A describes a method for moving a tailstock at a temporary pressing speed and pressing the tailstock against a workpiece, and when an electric current value of a servo motor that moves the tailstock exceeds a threshold, the tailstock is pressed at a control speed that is lower than the temporary pressing speed.

SUMMARY OF THE INVENTION

According to one aspect of the present invention, a machining apparatus includes a spindle, a tailstock, an actuator, a memory, and an processor. The spindle is configured to hold a first end of a workpiece to rotate the workpiece about a rotation axis. The tailstock is movable along the rotation axis and configured to be pressed in a first direction along the rotation axis against a second end of the workpiece opposite to the first end along the rotation axis. The actuator is configured to press the tailstock to the workpiece. The memory is configured to store a target pressing force that the actuator is to apply to the workpiece via the tailstock. The processor is configured to control the actuator to move the tailstock in the first direction at a first speed. The processor is configured to detect a contact between the tailstock and the workpiece based on a change in an input amount to the actuator while the actuator is controlled to move tailstock at the first speed. The processor is configured to control the actuator to stop moving the tailstock when the contact is detected. The processor is configured to control the actuator to move the tailstock by a first distance in a second direction opposite to the first direction along the rotation axis. The processor is configured to control the actuator to move the tailstock in the first direction at a second speed lower than the first speed. The processor is configured to control the actuator to stop moving the tailstock, when the input amount to the actuator becomes a value corresponding to the target pressing force while the actuator is controlled to move the tailstock at the second speed.

According to another aspect of the present invention, a method for pressing a tailstock of a machining apparatus, the method includes setting a target pressing force that an actuator is to apply via the tailstock to a workpiece attached to a spindle in a first direction along a rotation axis of the spindle by having the tailstock pressed against the workpiece. The method includes controlling the actuator to move the tailstock in the first direction at a first speed. The method includes detecting a contact between the tailstock and the workpiece based on a change in an input amount to the actuator while the actuator is controlled to move the tailstock at the first speed. The method includes controlling the actuator to stop moving the tailstock upon detection of the contact. The method includes controlling the actuator to move the tailstock by a first distance in a second direction opposite to the first direction. The method includes controlling the actuator to move the tailstock in the first direction at a second speed lower than the first speed. The method includes controlling the actuator to stop moving the tailstock, when the input amount to the actuator becomes a value corresponding to the target pressing force while the actuator is controlled to move the tailstock at the second speed.

According to further aspect of the present invention, a computer-readable storage medium stores a computer program for causing a processor to execute a process. The process includes obtaining a target pressing force that an actuator is to apply via a tailstock to a workpiece attached to a spindle in a first direction along a rotation axis of the spindle. The process includes controlling an actuator to move the tailstock in the first direction at a first speed. The process includes detecting a contact between the tailstock and the workpiece based on a change in an input amount to the actuator while the actuator is controlled to move the tailstock at the first speed. The process includes controlling the actuator to stop moving the tailstock upon detection of the contact. The process includes controlling the actuator to move the tailstock by a first distance in a second direction opposite to the first direction along the rotation axis. The process includes controlling the actuator to move the tailstock in the first direction at a second speed lower than the first speed. The process includes controlling the actuator to stop moving the tailstock, when the input amount to the actuator becomes a value corresponding to the target pressing force while the actuator is controlled to move the tailstock at the second speed.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 5 is a flowchart illustrating a processing flow of a second pressing method for pressing the tailstock in the present embodiment;

FIG. 6 is a flowchart illustrating a processing flow of a third pressing method for pressing the tailstock in the present embodiment.

DESCRIPTION OF THE EMBODIMENTS

Figure 1:
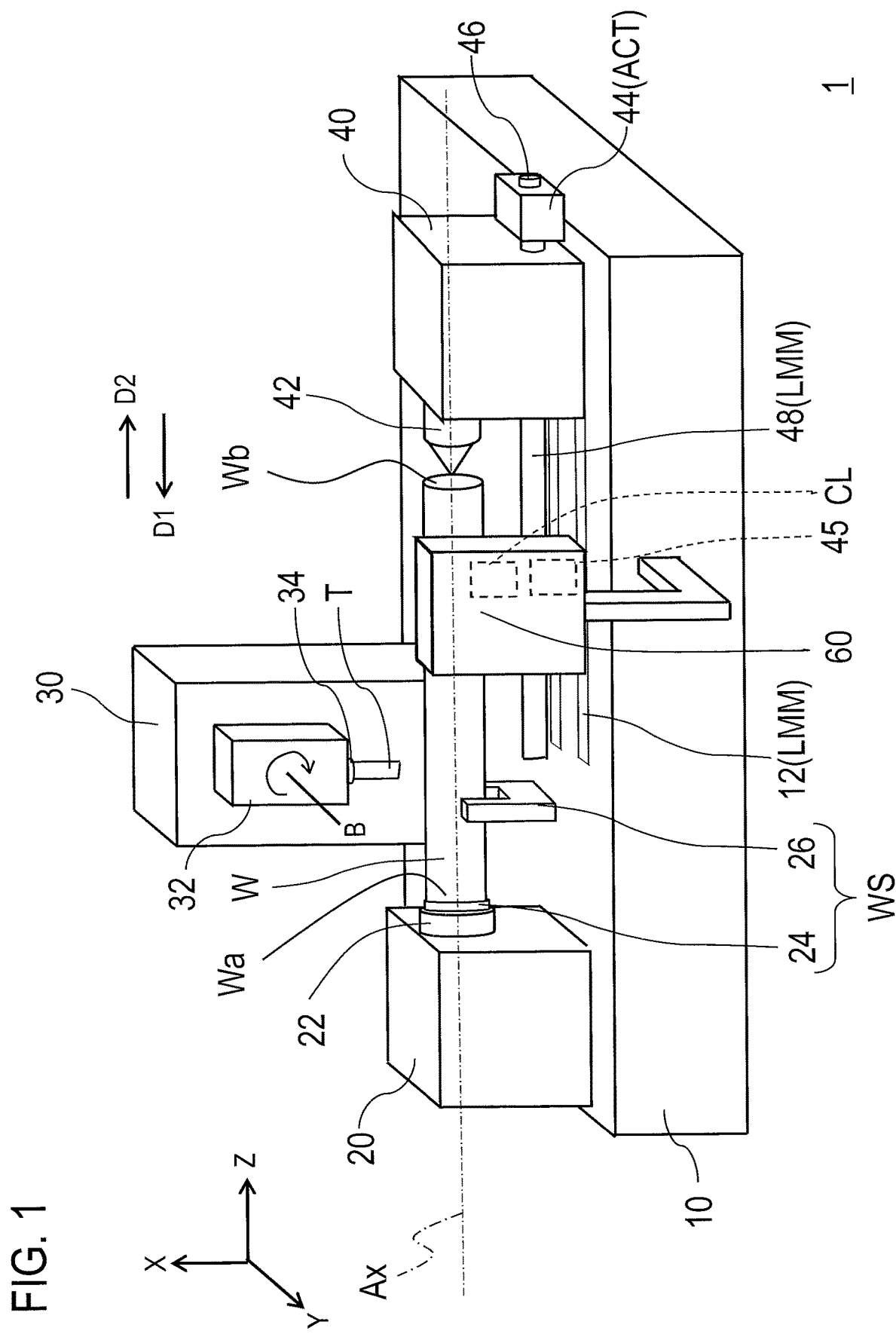
FIG. 1 is a diagram illustrating an external configuration of a machining apparatus according to an embodiment.

This invention will now be described with reference to the accompanying drawings, wherein like reference numerals designate corresponding or identical elements throughout the various drawings.

EMBODIMENTS

Configuration of Machining Apparatus 1

FIG. 1 is an external configuration diagram of a machining apparatus 1 according to an embodiment of the present invention. The machining apparatus 1 is, for example, a composite machining lathe. The machining apparatus 1 includes a base 10, a workpiece headstock 20, a spindle 22, a chuck 24, a steady rest 26, a carriage 30, a tool headstock 32, a tool spindle 34, and a tailstock 40. The workpiece headstock 20 is provided at one end of the base 10. The workpiece headstock 20 supports the spindle 22 to be rotatable about a rotation axis Ax. That is, one end (a first end Wa) of a workpiece W is attached to the spindle 22, and the spindle 22 is configured to rotate about the rotation axis Ax together with the workpiece W. In the following description, a direction along the rotation axis Ax will be referred to as a Z-axis direction, a direction along the rotation axis Ax and the height direction of the machining apparatus 1 will be referred to as an X-axis direction, and a direction perpendicular to the Z-axis direction and the X-axis direction will be referred to as a Y-axis direction. In addition, the Z-axis direction may be simply referred to as an axial direction.

The chuck 24 is provided on the spindle 22. The chuck 24 is configured to rotate together with the spindle 22 about the rotation axis Ax. The chuck 24 is configured to hold one end of the workpiece W. That is, one end of the workpiece W is attached to the spindle 22 via the chuck 24. The steady rest 26 is configured to support an intermediate portion of the workpiece W for the workpiece W to be rotatable about the rotation axis Ax. This configuration prevents chatter vibration during machining of the workpiece W, in particular, in a case where the workpiece W has a long shape. The intermediate portion of the workpiece W is located between the above-described one end of the workpiece W and the other end (a second end Wb) thereof on an opposite side to the above-described one end of the workpiece W in the axial direction. In the following description, the chuck 24 and the steady rest 26 will be collectively referred to as a workpiece holder WS. Therefore, the workpiece holder WS is configured to hold the workpiece W, and includes at least the chuck 24. It is to be noted that the workpiece holder WS may include the steady rest 26. In addition, although one steady rest 26 is illustrated in FIG. 1, the number of the steady rests 26 may be two or more.

The carriage 30 is provided on the base 10, and is movable in the Z-axis direction. The carriage 30 slides on a rail, not illustrated, provided on the base 10. The tool headstock 32 is mounted to be movable on a surface, of the carriage 30, facing the workpiece W. The tool headstock 32 is movable in the X-axis direction and the Y-axis direction, and is rotatable about a B axis, which is parallel to Y axis, and which serves as a rotation axis passing through a specific point of the carriage 30. The tool spindle 34 is provided on the tool headstock 32. A tool T is attachable to the tool spindle 34, and the tool spindle 34 is configured to drive the rotation of the tool T.

The tailstock 40 is provided on the other end side of the base 10, and is arranged to face the workpiece headstock 20 in the axial direction along the rotation axis Ax. The tailstock 40 includes a tailstock spindle 42. The tailstock spindle 42 is rotatable about the rotation axis Ax relative to the tailstock 40, and is configured to press the workpiece W, which is held by the workpiece headstock 20. The machining apparatus 1 includes an actuator ACT and a linear motion mechanism LMM for moving the tailstock 40 in the axial direction. The actuator ACT is, for example, a servo motor 44. The servo motor 44 generates a rotational force for moving the tailstock 40. The linear motion mechanism LMM includes a linear guide 12 and a ball screw 48. The linear guide 12 is provided on the base 10, and extends in parallel with the Z-axis direction. The ball screw 48 is disposed on the base 10 such that its longitudinal direction is parallel to the Z-axis direction. The ball screw 48 is connected with the servo motor 44, and converts the rotational force of the servo motor 44 into a drive force in the Z-axis direction of the tailstock 40. It is to be noted that a speed reduction mechanism, not illustrated, may be added to the output shaft of the servo motor 44, and the servo motor 44 and the ball screw 48 may be connected with each other via the speed reduction mechanism. It is to be noted that regarding the Z-axis direction, a direction from the tailstock 40 toward the spindle 22 will be referred to as a Z-axis negative direction or a first direction D1, and its reverse direction will be referred to as a Z-axis positive direction or a second direction D2.

The machining apparatus 1 further includes a servo driver 45 and a sensor 46 (for example, an encoder) for controlling the rotation speed and the torque of the servo motor 44. Thus, the actuator ACT is configured to control the movement of the tailstock 40 and the pressing force for pressing the tailstock 40 against the workpiece W. In addition, the tailstock 40 is configured to be movable in the axial direction and to be pressed against the other end of the workpiece W on an opposite side to one end thereof.

The machining apparatus 1 includes a cover, not illustrated, for covering instruments, and an operation panel 60. The operation panel 60 includes a display for displaying information through images for a user and/or a speaker for providing information through sounds for the user. Other than this, the operation panel 60 also includes a servo driver 45, a controller CL for controlling the machining apparatus 1, and an input device for receiving an input from the user. The servo driver 45 may be disposed outside the operation panel 60. The controller CL is a so-called numerical value controller. The detailed configuration of the controller CL will be described later.

Internal Configuration of Controller CL

Figure 2:
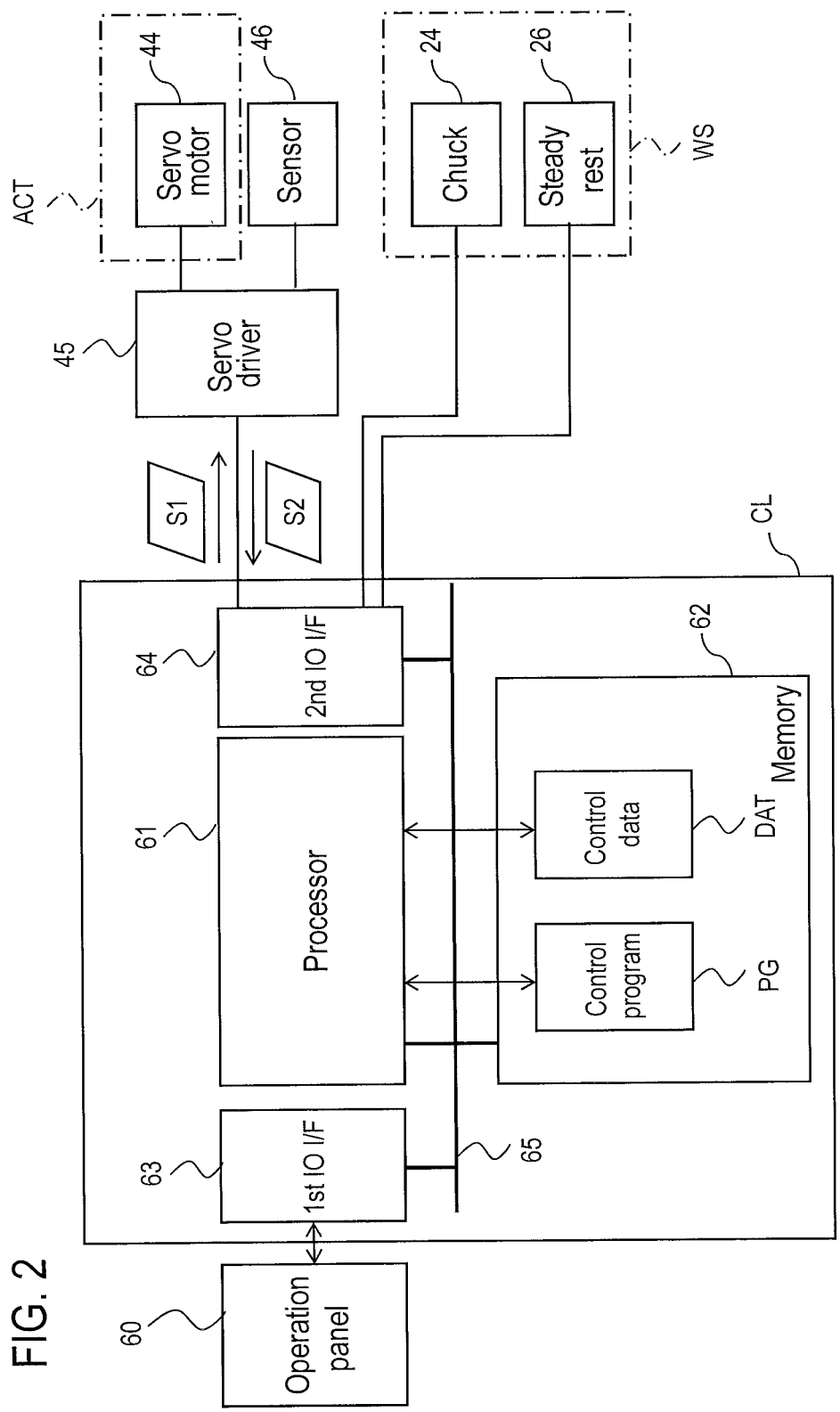
FIG. 2 is a block diagram illustrating an internal configuration of a controller.

FIG. 2 is a block diagram illustrating an internal configuration of the controller CL. Referring to FIG. 2, the controller CL includes a processor 61 and a memory 62. That is, the machining apparatus 1 further includes the processor 61 and the memory 62. The processor 61 is, for example, an electronic circuit (circuitry) such as a central processing unit (CPU). The memory 62 is configured to store a control program PG for controlling the machining apparatus 1 and to also store control data DAT. Such a control program PG is a computer program including instructions to be executed by the machining apparatus 1. By reading the control program PG from the memory 62 and executing the control program PG, the processor 61 controls the spindle 22, the tool spindle 34, the chuck 24, the steady rest 26, the actuator ACT (servo motor 44), and the like. The control data DAT includes predetermined parameters for controlling the movement of the tailstock 40.

The controller CL further includes a first Input-Output interface 63, a second Input-Output interface 64, a bus 65, a power supply, not illustrated, and the like. The first Input-Output interface 63 is connected with the operation panel 60. The first Input-Output interface 63 outputs images and sounds on the operation panel 60, and receives an input from a key, a touch panel, or the like of the operation panel 60. The bus 65 connects the processor 61, the memory 62, the first Input-Output interface 63, the second Input-Output interface 64, and the like to one another.

The second Input-Output interface 64 is connected with the servo driver 45, the chuck 24, the steady rest 26, and the like. In the present embodiment, in order to conduct speed control or position control of the servo motor 44, the processor 61 outputs a command signal S1 for communicating a speed command value or a position command value to the servo driver 45 via the second Input-Output interface 64, while executing the control program PG. The servo driver 45 outputs a drive current to the servo motor 44 by use of a well-known method such as PID control, so that the rotation speed or the rotation angle corresponding to the command signal S1 is achieved. In such a situation, the servo driver 45 receives an input of a signal from the sensor 46, and controls the drive current through feedback control. The servo driver 45 outputs a feedback signal S2 for communicating the value of the controlled drive current to the second Input-Output interface 64. Such a feedback signal S2 is sent to the processor 61. It is to be noted that since the function of the servo driver 45 as described above is well known, a detailed description thereof will be omitted.

The speed command value of the command signal S1 described above is a value corresponding to the rotation speed of the servo motor 44. The feed rate of the tailstock 40 is proportional to the rotation speed of the servo motor 44. Here, it is assumed that $N_m$ [min$^{-1}$] denotes a rotation speed of the motor, P [mm] denotes a lead of the ball screw 48 (the distance that the tailstock 40 travels per one rotation of the ball screw 48), A denotes a reduction ratio of the speed reduction mechanism that decelerates the output of the servo motor 44, and $V_f$ [mm/min] denotes a feed rate of the tailstock 40. In this situation, the following formula is satisfied.

$$V_f = PN_m/A \quad (1)$$

In the above formula, in a case where the speed reduction mechanism is not applied to the servo motor 44, A=1 may be set. In this manner, by outputting the command signal S1, the processor 61 is capable of controlling the feed rate of the tailstock 40. In addition, it is known that the servo motor 44 outputs torque proportional to a drive current value. Therefore, by multiplying a drive current value extracted from the feedback signal S2 by a torque multiplier or the like specific to the servo motor 44, the processor 61 is capable of calculating the output torque of the servo motor 44.

Furthermore, it is known that when the servo motor 44 applies the torque to the ball screw 48 and rotates the ball screw 48, a thrust force (thrust) received by the tailstock 40 from the ball screw 48 is proportional to the torque of the servo motor 44. For example, it is assumed that $T_m$ [Nmm] denotes torque generated by the motor, P [mm] denotes a lead of the ball screw 48, η denotes efficiency, and Fa [N] denotes a thrust force received by the tailstock 40. It is to be noted that the efficiency η is efficiency in consideration of all conversion mechanisms that convert a rotational motion of the servo motor 44 into a linear motion of the tailstock 40, and in a case where the conversion mechanism includes the speed reduction mechanism that decelerates the output of the servo motor 44, the efficiency η results in a value obtained by multiplying the reduction ratio A. In this situation, the following formula is satisfied.

$$Fa = 2T_m/P \quad (2)$$

While the tailstock 40 is in abutment with the workpiece W, the thrust force Fa corresponds to the pressing force for pressing the tailstock 40 against the workpiece W. Therefore, the processor 61 is capable of estimating the magnitude of the pressing force from the feedback signal S2. In addition to the above description, while executing the control program PG, the processor 61 outputs a signal for controlling opening or closing of the chuck 24 to the chuck 24 via the second Input-Output interface 64. While executing the control program PG, the processor 61 outputs either a signal for closing the clamp of the steady rest 26 or a signal for opening the clamp of the steady rest 26 to the steady rest 26 via the second Input-Output interface 64.

Relationship Between Drive Current of Servo Motor 44 and Pressing Force by Tailstock 40

Figure 3:
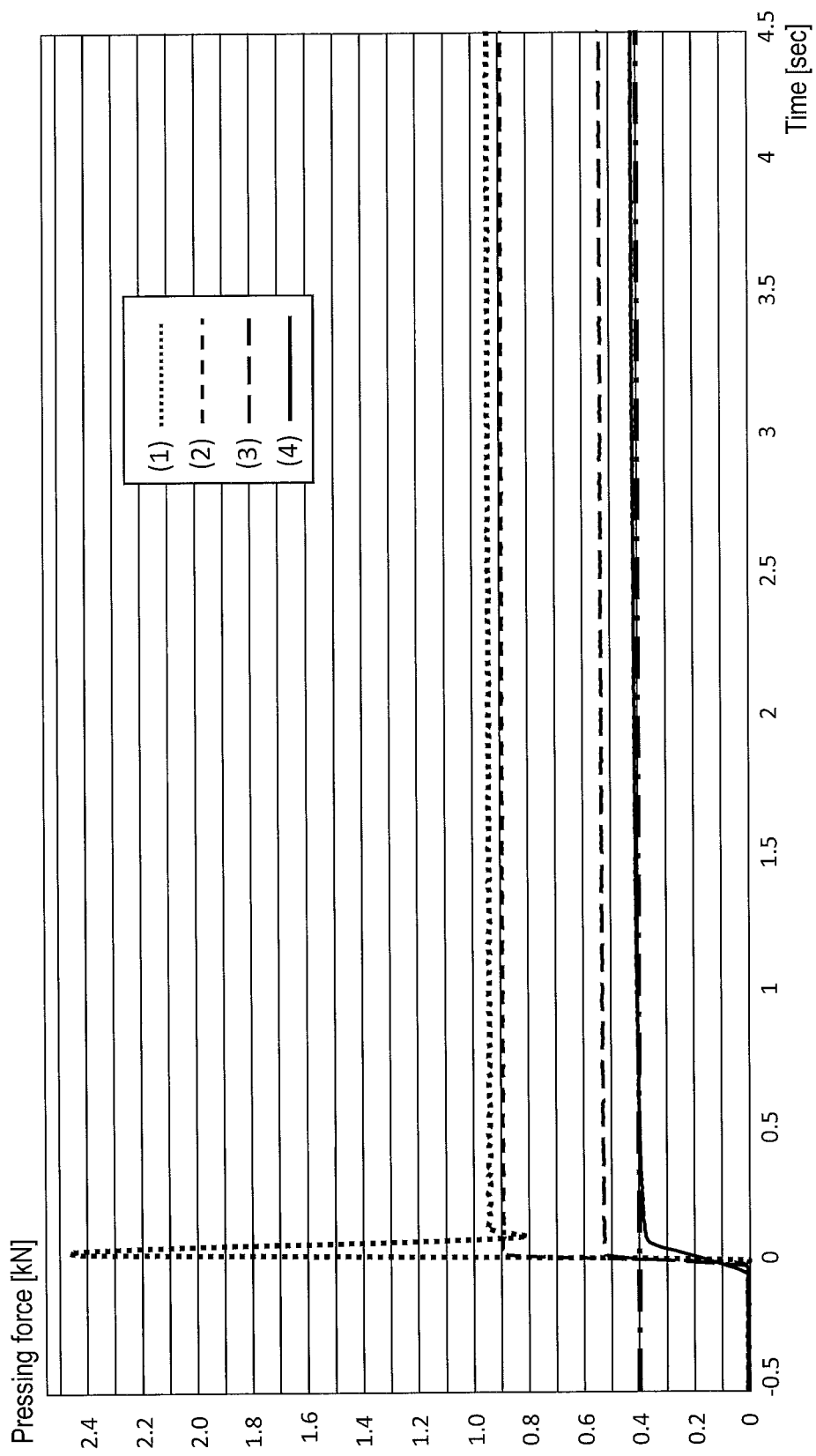
FIG. 3 is a diagram illustrating a relationship between a drive current of a servo motor and a pressing force by a tailstock.

Next, the relationship between the drive current of the servo motor 44 and the pressing force by the tailstock 40 will be described. In FIG. 3, instead of the workpiece W, a load cell is attached to the spindle 22, the command signal S1 is sent from the processor 61 to the servo driver 45 so as to move the tailstock 40 in the first direction D1 at feed rates of (1) 300 mm/min, (2) 100 mm/min, (3) 50 mm/min, and (4) 10 mm/min. When a drive current having a drive current value corresponding to a target pressing force (0.4 kN) is supplied from the servo driver 45 to the servo motor 44, and in a case where the command signal S1 is sent from the processor 61 to the servo driver 45 so as to stop the movement of the tailstock 40, temporal changes in the pressing force received by the load cell from the tailstock 40 are illustrated. For convenience in comparison among the cases (1) to (4), time 0 indicates the time when the drive current having the drive current value corresponding to the target pressing force (0.4 kN) is supplied from the servo driver 45 to the servo motor 44.

Referring to FIG. 3, as the speed of the tailstock 40 when the tailstock 40 abuts the workpiece W is faster, the workpiece W is deformed by an impact force (impact) at the time of abutment. Then, even though the movement of the tailstock 40 is stopped, the servo motor 44 will press the tailstock 40 against the workpiece W with a pressing force higher than the target pressing force. Specifically, it is assumed that the workpiece W has a cylindrical shape, that is, a cross-section perpendicular to the axial direction of the workpiece W is circular and uniform. In addition, it is assumed that A [mm$^2$] denotes a cross-sectional area of the workpiece W, 1 [mm] denotes the axial length of the workpiece W, E [MPa] denotes Young's modulus of the material of the workpiece W, M [kg] denotes a mass of the tailstock 40, V [mm/sec] denotes a feed rate of the tailstock 40 when the tailstock 40 abuts the workpiece W, and $\sigma_e$ [MPa] denotes stress applied to the workpiece W. In this situation, the following formula is satisfied.

$$(½)MV^2 = (\sigma_e^2/2E)Al \quad (3)$$

By solving this, $\sigma_e$ is obtained by the following formula.

$$\sigma_e = (ME/Al)V \quad (4)$$

Such stress $\sigma_e$ is applied to the workpiece W, in addition to the above-described thrust force Fa. Hence, as illustrated in FIG. 3, the pressing force by the tailstock 40 when the tailstock 40 abuts the workpiece W will deviate from the target pressing force, as the feed rate of the tailstock 40 increases. For this reason, after causing the tailstock 40 to abut the workpiece W, the machining apparatus 1 according to the present embodiment causes the tailstock 40 to move backward in the second direction D2 by a distance larger than an amount of distortion in which the workpiece W is distorted in the axial direction by an impact force (impact) at the time of abutment of the tailstock 40. Then, the machining apparatus 1 moves the tailstock 40 in the first direction D1 at a low speed to reduce a distortion amount $\Delta L_e$ of the workpiece W distorted in the axial direction, and presses the tailstock 40 against the workpiece W.

The distortion amount $\Delta L_e$, in which the workpiece W is distorted in the axial direction, is obtained as follows. First, distortion $\varepsilon_e$, in which the workpiece W is distorted in the axial direction by the impact force (impact) at the time of abutment of the tailstock 40, is obtained by the following formula.

$$\varepsilon_e = \sigma_e/E = (M/EAl)V \quad (5)$$

Then, the distortion amount $\Delta L_e$, in which the workpiece W is distorted in the axial direction by the impact force (impact) at the time of abutment of the tailstock 40, is obtained by the following formula. The distortion amount $\Delta L_e$ will be referred to as a theoretical value of the distortion amount.

$$\Delta L_e = \varepsilon_e l = (Ml/EA)V \quad (6)$$

The control data DAT includes the following data [1] to [5] in order to control the movement of the tailstock 40.

[1] At least one of: the value of the thrust force Fa corresponding to the target pressing force; the drive current value corresponding to the target pressing force (an input amount of the actuator ACT); and the value of the torque $T_m$ of the servo motor 44 corresponding to the target pressing force.

[2] Either the feed rate of the tailstock 40 (a first speed $V_1$ [mm/sec]) when the tailstock 40 first abuts the workpiece W or a speed command value corresponding to the first speed $V_1$.

[3] After the tailstock 40 is caused to move backward once, either the feed rate of the tailstock 40 (a second speed $V_2$ [mm/sec]) when the tailstock 40 abuts the workpiece W again or a speed command value corresponding to the second speed $V_2$.

[4] At least one of: a threshold of the drive current value (a threshold of the input amount of the actuator ACT) for the processor 61 to determine that the tailstock 40 abuts the workpiece W while the tailstock 40 is moving at the first speed $V_1$, by utilizing the fact that the thrust force necessary for moving the tailstock 40 is increased when the tailstock 40 abuts the workpiece W, while the tailstock 40 is moving at the first speed $V_1$; the thrust force Fa corresponding to the threshold of the drive current value; and the value of the torque $T_m$ of the servo motor 44 corresponding to the threshold of the drive current.

[5] Either a distance (first distance) for moving the tailstock 40 backward or a position command value to be output to the servo driver 45 for moving the tailstock 40 by the first distance.

An operator is able to optionally set the above data [1] to [5]. The target pressing force of [1] is determined beforehand by the operator, based on the material and the shape of the workpiece W, the machining condition, and the like. The first speed $V_1$ of [2] is determined beforehand by the operator, based on the material and the shape of the workpiece W, and the machining condition (production time), and the like. For the second speed $V_2$ of [3], the speed (10 mm/min in FIG. 3) at which the stress $\sigma_e$ (impact force) obtained by the formula (4) falls within a predetermined range (the influence of the impact force is substantially eliminated) is determined beforehand by the operator. The threshold of the input amount of the actuator ACT of [4] is determined beforehand, based on the material and the shape of the workpiece W, the machining condition, and the like. For the first distance of [5], the value obtained by adding an offset to the theoretical value $\Delta L_e$ of the distortion amount that has been calculated based on the first speed $V_1$ is determined beforehand by the operator. That is to say, the first distance is longer than the theoretical value $\Delta L_e$ of the distortion amount of the workpiece W that occurs due to the pressing. It is to be noted that details of the position command value corresponding to the first distance will be described later.

It is to be noted that each piece of the data [1] to [5] may be calculated by the processor 61, based on the material and the shape of the workpiece W, the machining condition (production time) that have been input beforehand by the machining program for the machining apparatus 1 to machine the workpiece W, and various parameters for calculating the formulas (1) to (6). In such a case, the control data DAT may further include the material and the shape of the workpiece W, the machining condition (production time), and various parameters for calculating the formulas (1) to (6).

First Pressing Method for Pressing Tailstock 40 and its Effects

Figure 4:
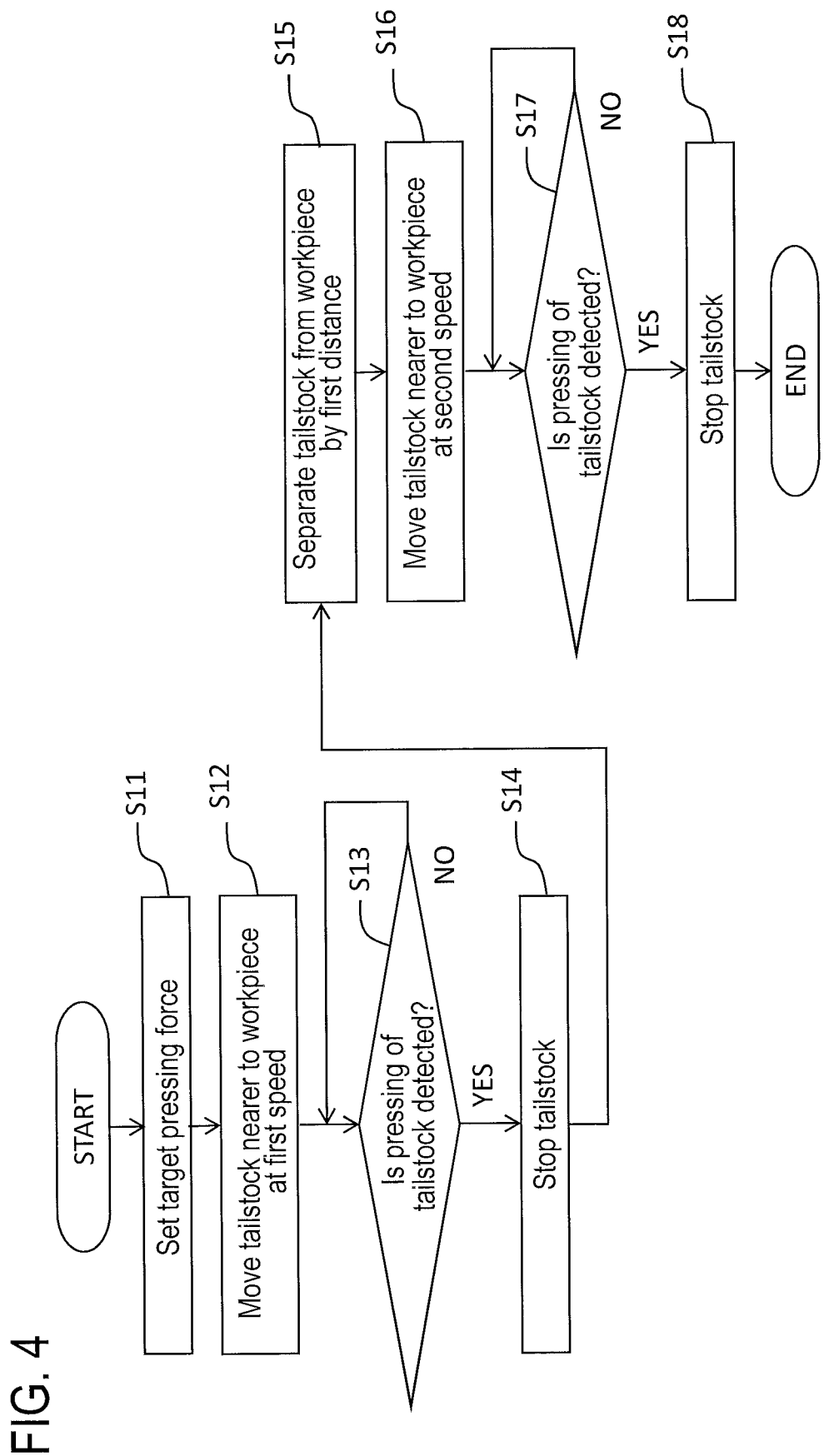
FIG. 4 is a flowchart illustrating a processing flow of a first pressing method for pressing the tailstock in the present embodiment.

In the following, a method for controlling the pressing of the tailstock 40 will be described. FIG. 4 is a flowchart illustrating a processing flow of a first pressing method for pressing the tailstock 40 in the present embodiment. The first pressing method is a method for pressing the tailstock 40, in a case where the operator manually attaches the workpiece W to the spindle 22 and then presses the tailstock 40 against the workpiece W. Each step in the first pressing method is achievable by the processor 61 executing the control program PG.

In step S11, the method sets, in the axial direction of the rotation axis Ax of the spindle 22, a target pressing force for pressing the tailstock 40 in the first direction along the rotation axis Ax on the other end of the workpiece W on an opposite side to one end thereof that is attached to the spindle 22 so as to rotate together with the spindle 22. The setting of such a target pressing force may be input into the controller CL by the operator by use of the operation panel 60. The target pressing force that has been input in this manner is stored as the control data DAT in the memory 62. It is to be noted that in step S11, instead of the target pressing force, the torque of the servo motor 44 and/or the drive current value for the servo motor 44, as indicated in the data [1], may be set. Even though these values are set, each setting of these values is substantially the same as the setting of the target pressing force.

In step S12, the method drives the actuator ACT (servo motor 44) that controls the movement of the tailstock 40 and the pressing force for pressing the tailstock 40 against the workpiece W so as to move the tailstock 40 in the first direction D1 at the first speed $V_1$. Specifically, the processor 61 reads, from the memory 62, either the first speed $V_1$ or the speed command value corresponding to the first speed $V_1$, stored as the control data DAT. Then, the processor 61 generates a command signal S1 for moving the tailstock 40 in the first direction D1 at the first speed $V_1$, based on the data that has been read, and sends the command signal S1 to the servo driver 45.

In step S13, the method detects pressing of the tailstock 40 against the workpiece W (a contact between the tailstock 40 and the workpiece W), based on a change in the input amount to the actuator ACT (servo motor 44) for moving the tailstock 40. In a case where the pressing is not detected (No in step S13), step S13 is repeated. The input amount is a current value supplied to the servo motor 44. Specifically, in a case where the drive current value extracted from the feedback signal S2 exceeds a threshold, the processor 61 determines that the pressing of the tailstock 40 has been done against the workpiece W. It is to be noted that in step S13, instead of the threshold of the drive current value, the pressing may be determined, based on the thrust force corresponding to the threshold of the drive current value indicated in the data [4] and the value of the torque of the servo motor 44 corresponding to the threshold of the drive current. Even though the pressing is determined with these values, it is substantially the same as the determination based on the change in the input amount to the actuator ACT (servo motor 44).

In step S14, upon detection of the pressing (Yes in step S13), the method controls the actuator ACT (servo motor 44) to stop the movement of the tailstock 40. Specifically, the processor 61 generates a command signal S1 including a speed command for setting the speed of the tailstock 40 to zero, and sends the command signal S1 to the servo driver 45.

In step S15, the method drives the actuator ACT (servo motor 44) to move the tailstock 40 by the first distance in the second direction D2, which is opposite to the first direction D1, along the rotation axis Ax. Specifically, it is assumed that $L_1$ [mm] denotes the first distance, P [mm] denotes the lead of the ball screw 48, A denotes the reduction ratio of the speed reduction mechanism that decelerates the output of the servo motor 44, and θ [deg] denotes a rotation angle of the servo motor 44. In this situation, the rotation angle θ [deg] of the servo motor 44 necessary for the tailstock 40 to move by the first distance $L_1$ [mm] is expressed by the following formula.

$$\theta = (L_1 A)/P360 \quad (7)$$

The processor 61 reads the first distance $L_1$ from the memory 62, calculates the rotation angle θ, based on the formula (7), generates a command signal S1 including a position command value for rotating the servo motor 44 by the rotation angle θ, and sends the command signal S1 to the servo driver 45. It is to be noted that in a case where the control data DAT includes the position command value to be output to the servo driver 45 for moving the tailstock 40 by the first distance $L_1$, the processor 61 may read the position command value from the memory 62, may generate the command signal S1 including the position command value, and may send the command signal S1 to the servo driver 45.

In step S16, the method drives the actuator ACT (servo motor 44) to move the tailstock 40 in the first direction D1 at the second speed $V_2$, which is lower than the first speed $V_1$. Specifically, the processor 61 reads, from the memory 62, either the second speed $V_2$ or the speed command value corresponding to the second speed $V_2$, stored as the control data DAT. Then, the processor 61 generates a command signal S1 for moving the tailstock 40 in the first direction D1 at the second speed $V_2$, based on the data that has been read, and sends the command signal S1 to the servo driver 45.

In step S17, the method determines whether the input amount (drive current value) into the actuator ACT (servo motor 44) has become a value corresponding to the target pressing force, while the tailstock 40 is moving at the second speed $V_2$. In a case where the input amount (drive current value) has not become the value corresponding to the target pressing force (No in step S17), step S17 is repeated. Specifically, the processor 61 reads the data [1] from the memory 62. In a case where the data [1] is not the drive current value corresponding to the target pressing force, the processor 61 calculates the drive current value corresponding to the target pressing force, based on the formula (2) or the like. Then, the processor 61 determines whether the drive current value extracted from the feedback signal S2 has reached the drive current value corresponding to the target pressing force.

In step S18, in a case where the input amount (drive current value) into the actuator ACT (servo motor 44) has become a value corresponding to the target pressing force (Yes in step S17), the method controls the actuator ACT (servo motor 44) to stop the movement of the tailstock 40. Specifically, the processor 61 generates a command signal S1 including a speed command for setting the speed of the tailstock 40 to zero, and sends the command signal S1 to the servo driver 45.

In the first pressing method for pressing the tailstock 40, when the pressing of the tailstock 40 against the workpiece W is detected, the tailstock 40 is separated from the workpiece W, and the tailstock 40 is caused to abut the workpiece W at the second speed $V_2$, which is lower than the first speed $V_1$. This eliminates the distortion of the workpiece W and/or the tailstock 40 that occurs when the workpiece W is pressed at the first speed $V_1$, and the actuator ACT (servo motor 44) controls the target pressing force with accuracy. In addition, the tailstock 40 is initially brought close to the workpiece W at a high speed and then the tailstock 40 is caused to abut the workpiece W at a low speed from the vicinity of the workpiece W. Therefore, the time for causing the tailstock 40 to abut the workpiece W can be shortened, and production efficiency can be improved.

Second Pressing Method for Pressing Tailstock 40 and its Effects

FIG. 5 is a flowchart illustrating a processing flow of a second pressing method for pressing the tailstock 40 in the present embodiment. The second pressing method is a method for pressing the tailstock 40, in a case where the machining apparatus 1 automatically attaches the workpiece W to the spindle 22, machines the workpiece W, and automatically detaches the workpiece W from the spindle 22. Each step in the second pressing method is achievable by the processor 61 executing the control program PG. In FIG. 5, the same processes as those illustrated in FIG. 4 are denoted by the same reference numerals. Detailed description of such processes will be omitted.

After step S11 ends, the second pressing method performs step S21. In step S21, the method attaches one end of the workpiece W to the spindle 22 so that the workpiece W rotates together with the spindle 22 about the rotation axis Ax of the spindle 22. Specifically, the processor 61 controls a workpiece carrier to carry the workpiece W to a position where one end of the workpiece W is engageable with the chuck 24. The processor 61 controls the chuck 24 to close so that the chuck 24 holds the workpiece W. In a case where the workpiece holder WS includes the steady rest 26, the processor 61 also controls the clamp of the steady rest 26 to close and hold the workpiece W. In this control, for example, when the processor 61 sends a control signal for closing the chuck 24, the reaction force received from the workpiece W at the time when the chuck 24 holds the workpiece W exceeds a predetermined threshold, and in this case, it can be considered that the chuck 24 is closed. In addition, when the processor 61 sends a signal for closing the clamp of the steady rest 26, the reaction force that the clamp of the steady rest 26 receives from the workpiece W exceeds a predetermined threshold, and in this case, it can be considered that the clamp of the steady rest 26 is closed.

In step S22, the method drives the actuator ACT (servo motor 44) to move the tailstock 40 in the first direction D1 at a third speed $V_3$, which is higher than the first speed $V_1$. In a case where the workpiece W is automatically attached to the spindle 22, the tailstock 40 is located at an initial position largely apart from the spindle 22. For this reason, from the viewpoint of the production efficiency, the third speed $V_3$ is desirably a high feed rate that has been determined beforehand in the machining apparatus 1. The control data DAT includes a speed command value corresponding to either the first speed $V_1$ or the third speed $V_3$. Specifically, the processor 61 reads, from the memory 62, either the third speed $V_3$ or a speed command value corresponding to the third speed $V_3$, stored as the control data DAT. Then, the processor 61 generates a command signal S1 for moving the tailstock 40 in the first direction D1 at the third speed $V_3$, based on the data that has been read, and sends the command signal S1 to the servo driver 45.

In step S23, the method determines whether the tailstock 40 has reached a position apart from the workpiece W by a predetermined distance in the second direction D2. More specifically, the method determines whether the tailstock 40 has reached the position apart from the other end of the workpiece W by a predetermined distance in the second direction D2. In a case where the position is not apart by the predetermined distance (No in step S23), the processing of step S23 is repeated. It is desirable that the predetermined distance be approximately 30 mm on an empirical basis. The position apart from the other end of the workpiece W by the predetermined distance in the second direction D2 can be calculated from the shape of the workpiece W. Specifically, the control data DAT includes the predetermined distance and the shape of the workpiece W. The processor 61 reads, from the memory 62, the predetermined distance and the shape of the workpiece W, which are stored as the control data DAT, and calculates the position apart from the other end of the workpiece W by the predetermined distance in the second direction D2. Then, in the same manner as in step S15, the processor 61 calculates the rotation angle of the servo motor 44, generates a command signal S1 including the position command value for rotating the servo motor 44 by the rotation angle, and sends the command signal S1 to the servo driver 45.

In step S24, when the tailstock 40 reaches the position apart by the predetermined distance (Yes in step S23), the method controls the actuator ACT (servo motor 44) to stop the movement of the tailstock 40. Specifically, the processor 61 generates a command signal S1 including a speed command for setting the speed of the tailstock 40 to zero, and sends the command signal S1 to the servo driver 45. After step S24, the method performs steps S12 to S18.

After step S18, the method waits for the end of machining of the workpiece W by the machining apparatus 1, in step S25. After machining of the workpiece W ends, the method drives the actuator ACT (servo motor 44) to move the tailstock 40 to the initial position in the second direction D2 at the third speed $V_3$, as in step S22. Then, the method controls the chuck 24 to open so as to detach one end of the workpiece W from the spindle 22. In a case where the workpiece holder WS includes the steady rest 26, the processor 61 also controls the steady rest 26 to be detached from the workpiece W. In addition, the processor 61 controls the workpiece carrier to carry the workpiece W out of the machining apparatus 1.

The second pressing method for pressing the tailstock 40 drives the actuator ACT (servo motor 44) to move the tailstock 40 at the third speed $V_3$, which is higher than the first speed $V_1$, to the position apart from the other end of the workpiece W by a predetermined distance in the second direction D2, before moving the tailstock 40 at the first speed $V_1$. Therefore, the tailstock 40 can be moved to the vicinity of the workpiece W at a high speed, and the machining time for machining the workpiece W can be shortened.

Third Pressing Method for Pressing Tailstock 40 and its Effects

FIG. 6 is a flowchart illustrating a processing flow of a third pressing method for pressing the tailstock 40 in the present embodiment. The third pressing method includes processing of temporarily opening the workpiece holder WS by an allowable amount and then closing again, while pressing the tailstock 40 against the workpiece W, in order to attach the workpiece W to the spindle 22 with high accuracy. Each step of the third pressing method is achievable by the processor 61 executing the control program PG. In FIG. 6, the same processes as those illustrated in FIG. 5 are denoted by the same reference numerals. Detailed description of such processes will be omitted.

After step S14 ends, the third pressing method performs step S31. In step S31, the method opens the workpiece holder WS at the time of detecting the pressing of step S13. Specifically, the processor 61 controls the chuck 24 to open so that the chuck 24 releases holding of the workpiece W. In a case where the workpiece holder WS includes the steady rest 26, the processor 61 may also control the clamp of the steady rest 26 sandwiching the workpiece W to open.

In step S32, the method determines whether the workpiece holder WS is opened from the workpiece W by an allowable amount. The workpiece holder WS being opened by the allowable amount means that the chuck 24 and the clamp of the steady rest 26 are opened to a predetermined allowable amount from a state where the workpiece holder WS holds the workpiece W. In a case where they are not opened by the allowable amount (No in step S32), the processing of step S31 is repeated. Specifically, in a case where it is possible to designate an amount (opening degree (divergence)) for moving the workpiece holder WS in a signal for opening the workpiece holder WS to be sent from the processor 61 to the workpiece holder WS, the processor 61 sends in step S31, to the workpiece holder WS, a signal in which the opening degree corresponding to the allowable amount is designated for opening the workpiece holder WS. In step S32, when a predetermined period of time has elapsed since the signal is sent, the processor 61 may determine that the workpiece holder WS is opened from the workpiece W by the allowable amount. Alternatively, in a case where it is possible to send a reply that the workpiece holder WS has reached the designated opening degree (divergence), the processor 61, by receiving a signal of the reply, may determine that the workpiece holder WS is opened from the workpiece W by the allowable amount. Furthermore, in a case where it is possible for the workpiece holder WS to send a reply of a signal indicating the opening degree to the processor 61, the processor 61 may determine whether the workpiece holder WS is opened from the workpiece W by the allowable amount, based on the signal indicating the opening degree.

In step S33, when the workpiece holder WS is opened by the allowable amount (Yes in step S32), the method closes the workpiece holder WS again. Specifically, the processor 61 controls the chuck 24 to close so that the chuck 24 holds the workpiece W. In a case where the workpiece holder WS includes the steady rest 26, the processor 61 may control the clamp of the steady rest 26 to close so that the clamp of the steady rest 26 holds the workpiece W. The control in step S33 is the same as the control in step S21.

In the third pressing method for pressing the tailstock 40, the workpiece holder WS configured to hold the workpiece W is opened by the allowable amount, when the pressing is detected in step S13. The workpiece holder WS is opened by the allowable amount, and then the workpiece holder WS is closed again to hold the workpiece W. Therefore, the workpiece W can be attached to the workpiece holder WS with high accuracy. After step S33 is performed, step S15 is performed.

Modifications

Figure 7:
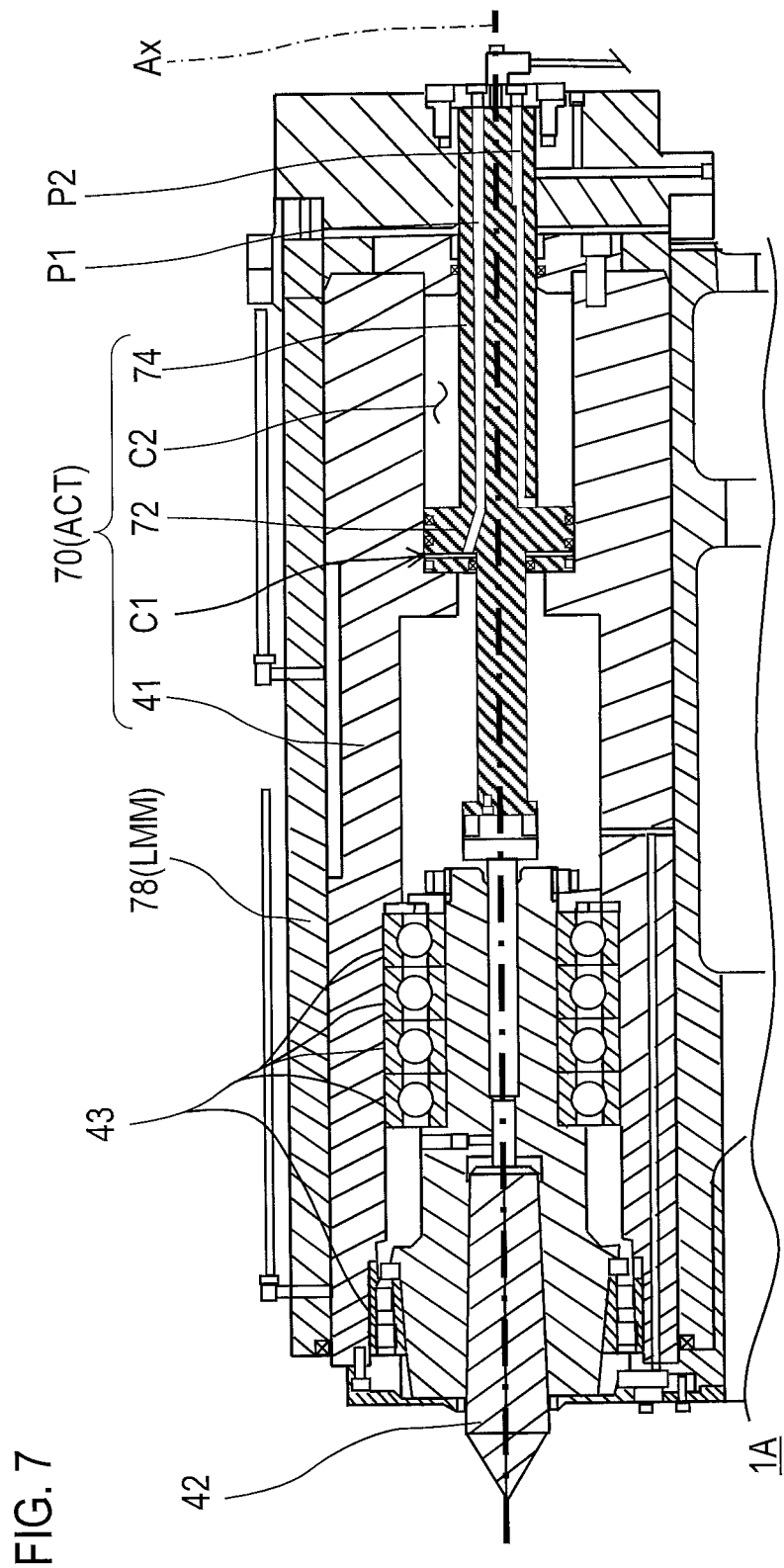
FIG. 7 is a diagram illustrating a machining apparatus including an actuator in a modification.

The servo motor 44 illustrated in the present embodiment is an example of the actuator ACT. The actuator ACT may be another actuator. FIG. 7 illustrates a machining apparatus 1A including a tailstock 41 in a case where a hydraulic cylinder 70 is used as the actuator ACT. The tailstock 41 corresponds to a cylinder body of the hydraulic cylinder 70. The machining apparatus 1A includes an external tube 78, which receives the tailstock 41. Since the external tube 78 guides the tailstock 41 so that the tailstock 41 moves in the axial direction, the external tube 78 corresponds to the linear motion mechanism LMM. A plurality of bearings 43 are interposed between the tailstock 41 and the tailstock spindle 42, and the tailstock spindle 42 is rotatable about the rotation axis Ax relative to the tailstock 41.

The hydraulic cylinder 70 includes the tailstock (cylinder body) 41, a piston 72, and a rod 74. The tailstock (cylinder body) 41, the piston 72, and the rod 74 form a first oil chamber C1 and a second oil chamber C2. FIG. 7 illustrates a case where the volume of the first oil chamber C1 is the smallest. A first oil passage P1 and a second oil passage P2 are formed in the rod 74. Hydraulic oil is fed to the first oil chamber C1 through the first oil passage P1, and the hydraulic oil is discharged from the first oil chamber C1 through the first oil passage P1. The hydraulic oil is fed to the second oil chamber C2 through the second oil passage P2, and the hydraulic oil is discharged from the second oil chamber C2 through the second oil passage P2. When the hydraulic oil is fed to the first oil chamber C1 through the first oil passage P1 and the hydraulic oil is discharged from the second oil chamber C2 through the second oil passage P2, the tailstock 41 moves toward the workpiece W. When the hydraulic oil is fed to the second oil chamber C2 through the second oil passage P2 and the hydraulic oil is discharged from the first oil chamber C1 through the first oil passage P1, the tailstock 41 moves away from the workpiece W. The feed rate of the tailstock 41 is adjustable by, for example, adjusting the flow rate of an aperture provided in the oil passage for discharging the hydraulic oil. The pressing force of the tailstock 41 is adjustable by adjusting the hydraulic pressure of the hydraulic oil. Therefore, the input amount of the actuator ACT described above corresponds to the size of the aperture or the hydraulic pressure of the hydraulic oil, in the present modification. Also in such an actuator ACT, the movement control of the tailstock 41 similar to the above-described embodiment is enabled.

In addition, the actuator ACT may be another actuator capable of linearly moving the tailstock 40 or 41. When the tailstock 40 or 41 moves at the first speed $V_1$ or the second speed $V_2$, the torque may be controlled by the servo driver 45 so that the drive current supplied to the servo motor 44 is equal to or smaller than a drive current value corresponding to the target pressing force. The first pressing method for pressing the tailstock 40 may include step S21. In such a case, step S21 may be performed manually by the operator.

Some or all of the functions of the above-described control program PG may be achieved by a dedicated processor or integrated circuit. The control program PG, without being limited to the memory 62 built in the controller CL, may be recorded in a storage medium that is detachable from the controller CL and that is readable by the controller CL, and examples of the storage medium include disks such as a floppy disk, an optical disk, a CD-ROM, and a magnetic disk, an SD card, a USB memory, and an external hard disk. The controller CL is an example of a computer.

In the present application, the term "comprise" and its variations are intended to mean open-ended terms, not excluding any other elements and/or components that are not recited herein. The same applies to the terms "include", "have", and their variations.

Also in the present application, a component suffixed with a term such as "member", "portion", "part", "element", "body", and "structure" is intended to mean that there is a single such component or a plurality of such components.

Also in the present application, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

Also in the present application, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

Also in the present application, the phrase "at least one of A and B" is intended to be interpreted as "only A", "only B", or "both A and B".

Obviously, numerous modifications and variations of the present invention are possible in light of the above teachings. It is therefore to be understood that within the scope of the appended claims, the present invention may be practiced otherwise than as specifically described herein.

What is claimed is:

1. A machining apparatus comprising:
a spindle configured to hold a first end of the workpiece to rotate the workpiece about a rotation axis;
a tailstock movable along the rotation axis and configured to be pressed in a first direction along the rotation axis against a second end of the workpiece opposite to the first end along the rotation axis;
an actuator configured to press the tailstock to the workpiece;
a memory configured to store a target pressing force that the actuator is to apply to the workpiece via the tailstock; and
a processor configured to
control the actuator to move the tailstock in the first direction at a first speed, detect a contact between the tailstock and the workpiece based on a change in an input amount to the actuator while the actuator is controlled to move the tailstock at the first speed, control the actuator to stop moving the tailstock when the contact is detected, control the actuator to move the tailstock by a first distance in a second direction opposite to the first direction along the rotation axis, control the actuator to move the tailstock in the first direction at a second speed lower than the first speed, and control the actuator to stop moving the tailstock, when the input amount to the actuator becomes a value corresponding to the target pressing force while the actuator is controlled to move the tailstock at the second speed.

2. The machining apparatus according to claim 1, wherein the first distance is larger than a theoretical value of a distortion amount of the workpiece that occurs due to the contact.

3. The machining apparatus according to claim 1,
wherein the contact is detected when the input amount to the actuator exceeds a threshold, and
wherein the threshold is set in accordance an input through an Input-Output interface of the machining apparatus.

4. The machining apparatus according to claim 1, wherein the processor is configured to control the actuator to move the tailstock at a third speed higher than the first speed to a position in the first direction, the position being apart from the second end of the workpiece by a predetermined distance in the second direction, before the processor controls the actuator to move the tailstock in the first direction at the first speed.

5. The machining apparatus according to claim 1,
wherein the actuator is a servo motor, and
wherein the input amount is an electric current value supplied to the servo motor.

6. The machining apparatus according to claim 1, further comprising:
a workpiece holder configured to hold the workpiece,
wherein the processor is configured to open the workpiece holder by an allowable amount upon detection of the contact and to close the workpiece again to hold the workpiece after opening the workpiece holder.

7. The machining apparatus according to claim 6,
wherein the workpiece holder comprises a chuck attached to the spindle, and
wherein the first end of the workpiece is held by the spindle via the chuck.

8. The machining apparatus according to claim 7,
wherein the workpiece holder further comprises at least one steady rest, and
wherein each of the at least one steady rest is configured to support an intermediate portion of the workpiece between the first end and the second end for the workpiece to be rotatable about the rotation axis.

9. The machining apparatus according to claim 1,
wherein the processor is configured to set the target pressing force.

10. A method for pressing a tailstock of a machining apparatus, the method comprising:
setting a target pressing force that an actuator is to apply via the tailstock to a workpiece attached to a spindle in a first direction along a rotation axis of the spindle;
controlling the actuator to move the tailstock in the first direction at a first speed;
detecting a contact between the tailstock and the workpiece based on a change in an input amount to the actuator while the actuator is controlled to move the tailstock at the first speed;
controlling the actuator to stop moving the tailstock upon detection of the contact;
controlling the actuator to move the tailstock by a first distance in a second direction opposite to the first direction along the rotation axis;
controlling the actuator to move the tailstock in the first direction at a second speed lower than the first speed; and
controlling the actuator to stop moving the tailstock, when the input amount to the actuator becomes a value corresponding to the target pressing force while the actuator is controlled to move the tailstock at the second speed.

11. The method according to claim 10, wherein the first distance is larger than a theoretical value of a distortion amount of the workpiece that occurs due to the contact.

12. The method according to claim 10, further comprising:
setting a threshold through an Input-Output interface of the machining apparatus,
wherein the contact is detected when the input amount to the actuator exceeds the threshold.

13. The method according to claim 10, further comprising:
controlling the actuator to move the tailstock at a third speed higher than the first speed to a position in the first direction before the controlling the actuator to move the tailstock at the first speed, the position being apart from the workpiece by a predetermined distance in the second direction.

14. The method according to claim 10,
wherein the actuator is a servo motor, and
wherein the input amount is an electric current value supplied to the servo motor.

15. The method according to claim 10, further comprising attaching a first end of the workpiece to the spindle rotatable together with the workpiece about the rotation axis of the spindle.

16. The method according to claim 10, further comprising:
opening a workpiece holder by an allowable amount upon detection of the contact, the workpiece holder being configured to hold the workpiece; and
closing the workpiece holder again to hold the workpiece after opening the workpiece holder.

17. The method according to claim 16,
wherein the workpiece holder comprises a chuck, and
wherein the first end of the workpiece is held by the spindle via the chuck.

18. The method according to claim 17, wherein the actuator presses the tailstock against a second end of the workpiece opposite to the first end of the workpiece in an axial direction of the rotation axis of the spindle.

19. The method according to claim 18,
wherein the workpiece holder further comprises at least one steady rest, and
wherein each of the at least one steady rest is configured to support an intermediate portion of the workpiece between the first end and the second end for the workpiece to be rotatable about the rotation axis.

20. A non-transitory computer-readable storage medium storing a computer program for causing a processor to execute a process comprising:
- obtaining a target pressing force that an actuator is to apply via a tailstock to a workpiece attached to a spindle in a first direction along a rotation axis of the spindle;
- controlling an actuator to move the tailstock in the first direction at a first speed;
- detecting a contact between the tailstock and the workpiece based on a change in an input amount to the actuator while the actuator is controlled to move the tailstock at the first speed;
- controlling the actuator to stop moving the tailstock upon detection of the contact;
- controlling the actuator to move the tailstock by a first distance in a second direction opposite to the first direction along the rotation axis;
- controlling the actuator to move the tailstock in the first direction at a second speed lower than the first speed; and
- controlling the actuator to stop moving the tailstock, when the input amount to the actuator becomes a value corresponding to the target pressing force while the actuator is controlled to move the tailstock at the second speed.

* * * * *